United States Patent
Fukushima et al.

(10) Patent No.: US 8,703,359 B2
(45) Date of Patent: Apr. 22, 2014

(54) FUEL CELL AND ELECTRONIC DEVICE

(75) Inventors: Kazuaki Fukushima, Kanagawa (JP); Shuji Goto, Kanagawa (JP); Jusuke Shimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 543 days.

(21) Appl. No.: 12/667,181

(22) PCT Filed: Jun. 27, 2008

(86) PCT No.: PCT/JP2008/061722
§ 371 (c)(1),
(2), (4) Date: Dec. 29, 2009

(87) PCT Pub. No.: WO2009/008268
PCT Pub. Date: Jan. 15, 2009

(65) Prior Publication Data
US 2011/0020714 A1    Jan. 27, 2011

(30) Foreign Application Priority Data
Jul. 6, 2007  (JP) .................. 2007-178364

(51) Int. Cl.
*H01M 8/04* (2006.01)
*H01M 8/24* (2006.01)
*H01M 8/22* (2006.01)

(52) U.S. Cl.
USPC ........... 429/513; 429/447; 429/454; 429/503; 429/515

(58) Field of Classification Search
None
See application file for complete search history.

(56) References Cited

U.S. PATENT DOCUMENTS

| | | |
|---|---|---|
| 5,364,711 A | 11/1994 | Yamada et al. |
| 5,432,023 A | 7/1995 | Yamada et al. |
| 6,447,941 B1 | 9/2002 | Tomimatsu et al. |
| 2003/0072982 A1 | 4/2003 | Takeuchi et al. |

(Continued)

FOREIGN PATENT DOCUMENTS

| | | |
|---|---|---|
| EP | 1333519 | 8/2003 |
| JP | 1994-188008 | 7/1994 |

(Continued)

OTHER PUBLICATIONS

Supplementary European Search Report for Appitcation No. 08790687.1-1227/2173001 corresponding to PCT/JP2008061722 dated Jun. 16, 2011.

(Continued)

*Primary Examiner* — Patrick Ryan
*Assistant Examiner* — Muhammad Siddiquee
(74) *Attorney, Agent, or Firm* — K&L Gates LLP

(57) ABSTRACT

A fuel cell capable of being thinned while maintaining a stable electric power supply is provided. A fuel cell includes a power generation section, a fuel tank, a fuel supply section (pump), and a fuel vaporization section. The power generation section has a structure in which a combined body is sandwiched between a cell plate and a cell plate. The combined body has a structure in which an anode electrode and a cathode electrode are oppositely arranged with an electrolyte film in between. In particular, the fuel supply section and the fuel vaporization section are integrally provided, and are connected by a nozzle section buried therein. A fuel contained in the fuel tank is pumped by the fuel supply section according to the state of the power generation section, and then is vaporized by the fuel vaporization section, and is supplied to the power generation section side.

10 Claims, 8 Drawing Sheets

(56) References Cited

U.S. PATENT DOCUMENTS

| | | | |
|---|---|---|---|
| 2003/0143444 A1* | 7/2003 | Liu et al. | 429/19 |
| 2004/0191583 A1 | 9/2004 | Kelley et al. | |
| 2004/0209133 A1* | 10/2004 | Hirsch et al. | 429/22 |
| 2006/0019141 A1 | 1/2006 | Okuto et al. | |
| 2006/0292412 A1* | 12/2006 | Faghri et al. | 429/26 |
| 2007/0099058 A1* | 5/2007 | Adams et al. | 429/34 |
| 2010/0203427 A1* | 8/2010 | Hasebe et al. | 429/524 |

FOREIGN PATENT DOCUMENTS

| | | | | |
|---|---|---|---|---|
| JP | 2000-106201 | 4/2000 | | |
| JP | 2003-317791 | 11/2003 | | |
| JP | 2006-004784 | 1/2006 | | |
| JP | 2006-49113 | 2/2006 | | |
| JP | 2006-523938 | 10/2006 | | |
| JP | 2007-123039 | 5/2007 | | |
| WO | WO2007034756 | * | 3/2007 | H01M 8/02 |

OTHER PUBLICATIONS

Chemical Large Dictionary 9, Kyoritsu Shuppan Co., Ltd., 1964, Pocket Edition, p. 138.

Illustration, All of Fuel Battery, Kogyo Chosakai Publishing Co., Ltd, 2003, First Edition, p. 15.

European Office Action issued Aug. 10, 2012 for corresponding European Appln. No. 08790687.1.

Japanese Office Action issued Aug. 29, 2012 for corresponding Japanese Appln. No. 2007-178364.

* cited by examiner

FUEL CELL AND ELECTRONIC DEVICE

CROSS REFERENCE TO RELATED APPLICATIONS

The present application is a national stage of International Application No. PCT/JP2008/061722 filed on Jun. 27, 2008 and claims priority to Japanese Patent Application No. 2007-178364 filed on Jul. 6, 2007, the disclosures of which are incorporated herein by reference.

BACKGROUND

The present invention relates to a fuel cell in which power generation is made by using chemical reaction between a fuel and an oxidant and an electronic device including such a fuel cell.

Currently, as an electrochemical device with which a new style different from a primary battery and a secondary battery is able to be proposed, a fuel cell in which power generation is made by using chemical reaction between a fuel and an oxidant has attracted attention. The fuel cell has a structure in which an electrolyte is arranged between an anode electrode (fuel electrode) and a cathode electrode (oxygen electrode). The fuel is supplied to the anode electrode side, and the oxidant is supplied to the cathode electrode side. Thereby, chemical energy of the fuel is effectively converted to electric energy. In the fuel cell, since power generation is made by using the chemical reaction between the fuel and the oxidant, electric power is able to be continuously extracted by supplying oxygen in the air as the oxidant and continuously resupplying the fuel from outside.

As the fuel cell, various types of fuel cells have been already proposed or experimentally produced, and part thereof is practically used. Specially, since a Polymer Electrolyte Fuel Cell (PEFC) in which a proton conductive polymer film is used as an electrolyte operated at comparatively low temperature such as about from 30 deg C. to 130 deg C. both inclusive without an electrolytic solution, the PEFC is able to be thinned, and is suitable as an electric power source for a mobile electronic device.

Further, as a fuel thereof, various materials such as hydrogen and methanol are able to be used. Specially, since a liquid fuel such as methanol has a higher density than that of gas and is easily stored, the liquid fuel is taken as a hopeful fuel for a fuel cell included in a small electronic device. In particular, since a Direct Methanol Fuel Cell (DMFC) in which methanol is directly supplied to the anode electrode to initiate reaction does not need a reformer for extracting hydrogen from a fuel, the DMFC is advantageous to realizing a small and thin device.

In such a DMFC, as a method of supplying methanol to the anode electrode, a liquid supply type DMFC and a vaporization supply type DMFC have been proposed. Of the foregoing, in the liquid supply type DMFC, a liquid fuel (methanol aqueous solution) is directly supplied to the anode electrode. In the liquid supply type DMFC, since the liquid fuel is directly contacted with the anode electrode, methanol crossover in which methanol is moved from the anode electrode side to the cathode electrode side through the electrolyte film is easily generated. In particular, in the case where highly concentrated methanol is used, voltage reduction is caused, and usage efficiency of methanol is significantly lowered. In such a case, reaction is not able to be effectively promoted unless the fuel concentration is decreased. However, if the fuel concentration is decreased, in addition to lowering of energy density, excessive water reaches the cathode electrode, and flooding phenomenon is more easily generated. Further, on the anode electrode contacted with the methanol solution, carbon dioxide ($CO_2$) is generated by oxidation reaction. Thus, bubbles of carbon dioxide are adhered onto the electrode, and supplying the methanol solution is inhibited. Thus, the output is lowered or becomes unstable.

Meanwhile, in the vaporization supply type DMFC, based on moisture concentration equilibrium between both electrodes, water generated in the cathode electrode is inversely diffused to the anode electrode side, and thereby water consumed in the anode electrode is able to be resupplied. Thus, a highly-concentrated methanol aqueous solution is able to be used, and moisture in the electrolyte film is able to be retained by self-humidification, and accordingly proton conductivity necessary for power generation is able to be maintained in the electrolyte film. Therefore, usage efficiency of methanol is improved, and a high energy density is able to be retained. In the past, as a vaporization fuel supply method, a method of naturally vaporizing a fuel in a fuel tank, a method of using capillary force (for example, Patent Documents 1 and 2) and the like have been proposed. In addition, a technology of providing a pump (fuel supply section) for pumping a liquid fuel from a storage tank and supplying the liquid fuel to the power generation side and a fuel vaporization section for vaporizing the liquid fuel supplied by the fuel supply section has been proposed.

[Patent Document 1] Japanese Patent No. 3413111
[Patent Document 2] Japanese Unexamined Patent Application Publication No. 6-188008

DISCLOSURE OF SUMMARY

However, in the case where the fuel is supplied by natural vaporization or capillary force from the tank, the fuel supply amount is not able to be changed according to the power generation state and necessary electric power of a device, and time is consumed for startup and stop, and thus there has been a disadvantage that stable electric power supply is not realized. Hence, if the fuel supply section such as a pump is used to supply the fuel without using natural vaporization or capillary force from the tank, the fuel is able to be supplied according to the power generation state. However, in the structure including the fuel supply section and the fuel vaporization section, a piping (joint section) such as a silicon tube is provided in between. Thus, there has been a disadvantage that the thickness of the whole cell is increased due to the joint section.

In view of the foregoing disadvantages, it is an object of the present invention to provide a fuel cell capable of being thinned while maintaining stable electric power supply and an electronic device including the same.

A fuel cell according to the present invention includes a power generation section in which a pair of electrodes are oppositely arranged with an electrolyte film in between; a fuel tank containing a liquid fuel; a fuel supply section supplying the liquid fuel from the fuel tank to the power generation section side, and being able to adjust a supply amount thereof; and a fuel vaporization section vaporizing the liquid fuel supplied by the fuel supply section, wherein the fuel supply section and the fuel vaporization section are integrally provided.

An electronic device according to the present invention includes the fuel cell having the foregoing structure.

In the fuel cell and the electronic device according to the present invention, the fuel amount supplied from the fuel tank to the power generation section side by the fuel supply section is adjustable. Thus, differently from a case that the fuel is supplied by natural vaporization and capillary force, for example, the fuel supply amount is able to be changed according to the power generation state and the necessary electric power of a device, and startup and stop are enabled at desired time. Further, since the fuel supply section and the fuel vaporization section are integrally provided, the existing joint section such as a piping provided between the fuel supply section and the fuel vaporization section is not necessitated.

According to the fuel cell and the electronic device of the present invention, the fuel amount supplied to the power generation section side by the fuel supply section is adjustable, and the fuel supply section and the fuel vaporization section are integrally provided. Thus, stable electric power supply is enabled, and the whole thickness becomes thinner than that of the existing case in which the joint section such as a piping is provided between the fuel supply section and the fuel vaporization section. Thus, while stable electric power supply is retained, thinning the fuel cell is able to be realized.

Additional features and advantages of the present invention are described in, and will be apparent from, the following Detailed Description and the Figures.

DETAILED DESCRIPTION

An embodiment of the present invention will be hereinafter described in detail.

Figure 1:
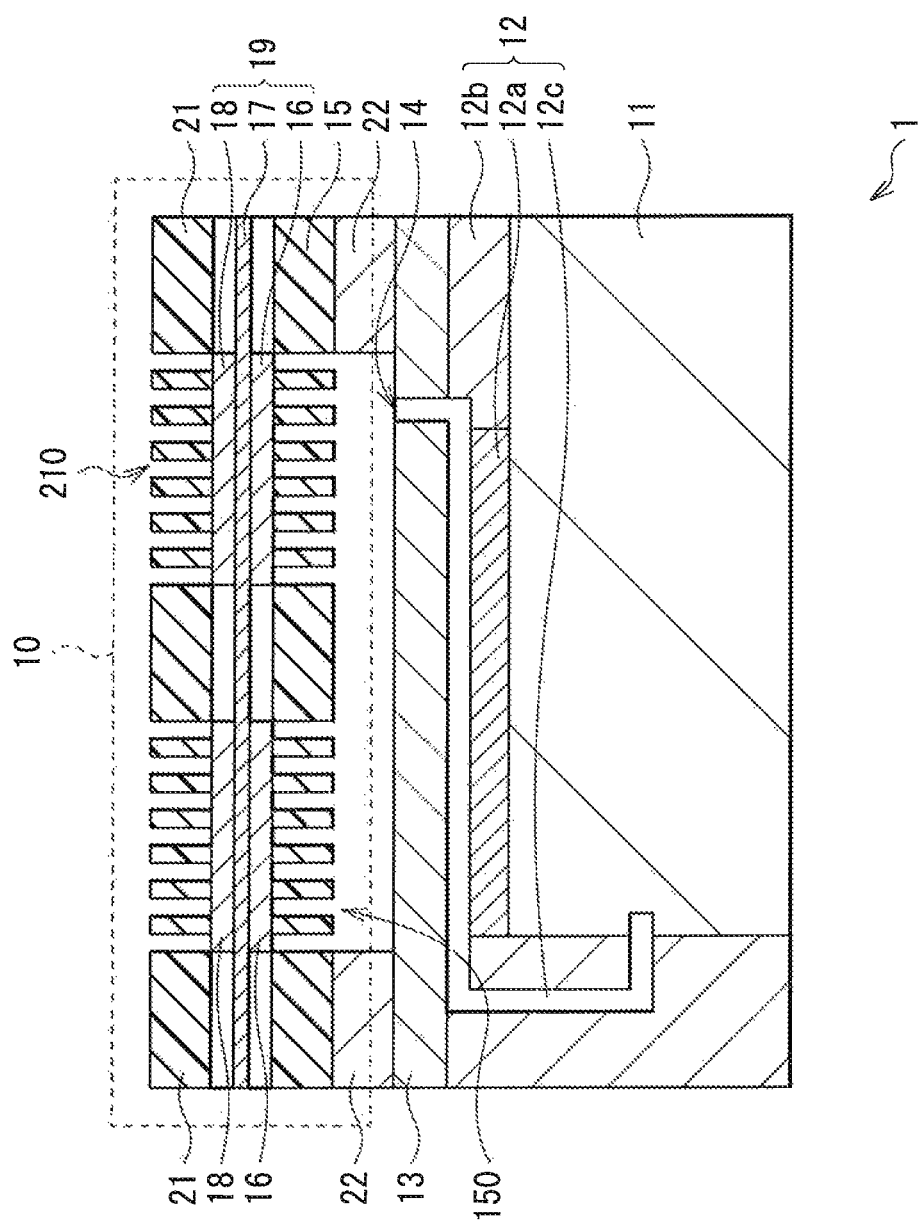
FIG. 1 is a cross sectional structure illustrating a schematic structure of a fuel cell according to an embodiment of the present invention.
Figure 2:
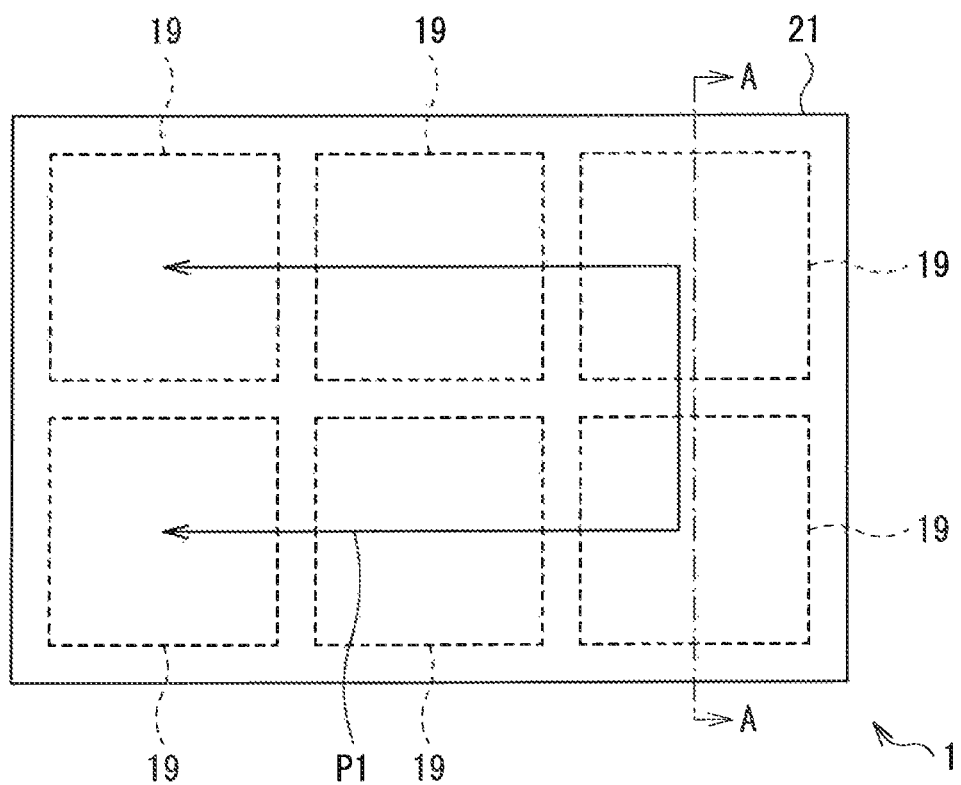
FIG. 2 is a plan view illustrating a structure of the fuel cell illustrated in FIG. 1 viewed from the cell plate 21 side.

FIG. 1 illustrates a cross sectional structure of a fuel cell 1 according to an embodiment of the present invention. FIG. 2 illustrates a planar structure of the fuel cell 1. However, FIG. 1 corresponds to a cross sectional structure taken along line A-A of FIG. 2. The fuel cell 1 is a Direct Methanol Fuel Cell (DMFC) in which a liquid fuel such as methanol is directly supplied and reacted, and is used for a mobile device such as a mobile phone and a Personal Digital Assistant (PDA) or an electronic device such as a notebook Personal Computer (PC).

The fuel cell 1 includes a power generation section 10, a fuel tank 11, a fuel supply section 12, and a fuel vaporization section 13. The power generation section 10 has a structure in which a combined body 19 is sandwiched between a pair of cell plates 15 and 21. On the cell plate 15 side of the power generation section 10, the fuel tank 11, the fuel supply section 12, and the fuel vaporization section 13 are provided. In particular, the fuel supply section 12 and the fuel vaporization section 13 are integrally provided. That is, the fuel supply section 12 and the fuel vaporization section 13 are layered with no space in between in the thickness direction. Due to such a structure, a fuel contained in the fuel tank 11 is supplied to the power generation section 10 side by the fuel supply section 12 and the fuel vaporization section 13, and is used for power generation.

First, a description will be given of a structure of the combined body 19 of the power generation section 10. As illustrated in FIG. 2, in total, six combined bodies 19 are arranged in a matrix of three by two in the in-plane direction. Further, for example, as indicated by symbol P1, the six combined bodies 19 are electrically connected to each other in series by a current collector structure (not illustrated). The respective combined bodies 19 have a structure in which an anode electrode (fuel electrode) 16 and a cathode electrode (oxygen electrode) 18 are oppositely arranged with an electrolyte film 17 in between. The combined body 19 is sandwiched between the cell plates 15 and 21, and is sealed with, for example, a gasket (not illustrated). While in FIG. 1, the electrolyte film 17 is a layer common to the plurality of combined bodies 19, the electrolyte film 17 may be provided for every combined body 19.

The electrolyte film 17 is made of, for example, a proton conductive material having a sulfonate group ($-SO_3H$). Examples of proton conductive materials include a polyperfluoroalkyl sulfonic acid proton conductive material (for example, "Nafion (registered trademark)," Du Pont make), a hydrocarbon system proton conductive material such as polyimide sulfone acid, and a fullerene system proton conducive material.

The anode electrode 16 and the cathode electrode 18 have, for example, a structure in which a catalyst layer containing a catalyst such as platinum (Pt) and ruthenium (Ru) is formed on a gas diffusion base material such as carbon paper. The catalyst layer is made of, for example, a material in which a supporting body such as carbon black supporting a catalyst is dispersed in the polyperfluoroalkyl sulfonic acid proton conductive material or the like. A liquid fuel containing methanol or the like is supplied as gas through an opening 150 provided in the cell plate 15 to the anode electrode 16. Further, the cathode 18 is communicated with outside through an aperture 210 provided in the cell plate 21, and air, that is, oxygen is supplied by natural ventilation or an air supply pump (not illustrated).

The fuel tank 11 is intended to contain a liquid fuel necessary for power generation such as a methanol aqueous solution. In the fuel tank 11, an inlet of a flow path 12c (described later) structuring the fuel supply section 12 is provided.

The fuel supply section 12 functions as a pump to pump the liquid fuel contained in the fuel tank 11 and supply (transport) the liquid fuel to the power generation section 10 side, and is able to adjust the supply amount of the fuel. The fuel supply section 12 has, for example, a piezoelectric body 12a, a piezoelectric body support resin section 12b for supporting the piezoelectric body 12a, and the flow path 12c as a piping that connects the fuel tank 11 to a nozzle section 14. The piezoelectric body 12a has, for example, a piezoelectric device (not illustrated) and a barrier membrane as a pump chamber formed on the piezoelectric device (not illustrated), and has a structure to pump the fuel in a diaphragm-manner. Specifically, the piezoelectric device is shrunk by being applied with a voltage. However, since the piezoelectric device is fixed on a plate (described later) of the high rigid fuel vaporization section 13 with the piezoelectric body support resin section 12b in between, the piezoelectric device vibrates up and down. Thereby, the barrier membrane formed on the piezoelectric device vibrates, and cubic volume change is generated inside the space (pump chamber) surrounded by the barrier membrane. Further, the flow path 12c formed in the piezoelectric body support resin section 12b is provided with a check valve (described later). Thus, the fuel is transported in one direction from the fuel tank 11 to the fuel vaporization section 13.

As the piezoelectric body support resin section 12b, a resin material having high resistivity to methanol such as cycloolefin copolymer (COC), polyethylene, and polypropylene is able to be used. The flow path 12c formed in the piezoelectric body support resin section 12b in the vicinity of the piezoelectric body 12a is provided with the check valve (not illustrated). Further, the piezoelectric body 12a is not limited to the piezoelectric device, but the fuel is able to be pumped by using other device such as an electromagnetic pump and an electroosmotic flow pump. The thickness of the fuel supply section 12 is, for example, from 0.5 mm to 1.5 mm both inclusive.

The fuel vaporization section 13 vaporizes the fuel supplied by the fuel supply section 12, and also functions as a plate that supports the fuel supply section 12 (piezoelectric device). The fuel vaporization section 13 has a structure in which a diffusion section (not illustrated) for promoting diffusion of the fuel is provided on a plate made of, for example, stainless steel, a metal or an alloy containing aluminum or the like, or a resin material having a high rigidity such as cycloolefin copolymer (COC). As the diffusion section, an inorganic porous material such as alumina, silica, and titanium oxide or a resin porous material is able to be used. The thickness of the fuel vaporization section 13 is, for example, from 0.1 mm to 1.0 mm both inclusive. However, the fuel vaporization section 13 is preferably made of an SUS plate, since thereby effective fuel supply is enabled without increasing the thickness of the fuel supply section 12, and thus such a structure becomes advantageous to realizing a thin fuel cell.

The nozzle section 14 is an ejection hole of the fuel transported by the flow path 12c of the fuel supply section 12, and ejects the fuel toward the diffusion section provided on the surface of the fuel vaporization section 13. Thereby, the fuel transported to the fuel vaporization section 13 is diffused and vaporized, and supplied toward the power generation section 10. The nozzle section 14 has, for example, a bore diameter from 0.1 mm to 0.5 mm both inclusive.

Further, between the power generation section 10 and the fuel vaporization section 13, a sealing layer 22 is provided in the outer circumferential section of the power generation section 10. The sealing layer 22 is made of a resin material such as silicon rubber, ethylene-propylene-diene rubber, and Teflon (registered trademark). Thereby, a certain space is provided between the power generation section 10 and the fuel vaporization section 13, the fuel ejected from the fuel vaporization section 13 side is diffused by the space, and the fuel is uniformly supplied to the power generation section 10.

The fuel cell 1 is able to be manufactured, for example, as follows.

First, the electrolyte film 17 made of the foregoing material is sandwiched between the anode electrode 16 and the cathode electrode 18 made of the foregoing material, and the resultant is thermally compression-bonded, for example, at 130 deg C. and under a pressure of 0.5 kN for 15 minutes. Thereby, the anode electrode 16 and the cathode electrode 18 are jointed to the electrolyte film 17 to form the combined body 19.

Next, the formed combined body 19 is sandwiched between the pair of cell plates 15 and 21 through the gasket (not illustrated), the resultant is fastened by, for example, a screw or the like, and the current collector structure (not illustrated) is provided therefor. Thereby, the power generation section 10 in which the plurality of combined bodies 19 are connected in series is formed.

Meanwhile, the fuel supply section 12 and the fuel vaporization section 13 are integrally formed as follows. First, as the fuel vaporization section 13, a round hole having a desired bore diameter is created in the plate made of the foregoing material or the like by cutting or etching, and thereby the nozzle section 14 is formed. Subsequently, the piezoelectric body 12a is fixed on the rear face side of the plate in which the nozzle 14 is formed with the piezoelectric body support resin section 12b in which the flow path 12c is formed in between, and thereby the fuel supply section 12 is formed. Next, the diffusion section made of the foregoing material is adhered to the front face side of the foregoing plate. To directly diffuse the fuel on the fuel vaporization section 13, the size of the plate and the size of the diffusion section are preferably formed to match with the size of the power generation section 10 necessary for fuel supply. Further, it is possible that after the nozzle section 14 is formed in the plate, the diffusion section is formed on the front face side of the plate first, and then the fuel supply section 12 is formed on the rear face side thereof. Accordingly, the fuel supply section 12 and the fuel vaporization section 13 are integrally formed.

Next, the power generation section 10 is sealed with the sealing layer 22, and thereby the power generation section 10 is connected to the fuel vaporization section 13 side of the fuel supply section 12 and the fuel vaporization section 13 integrally formed. To remove carbon dioxide, the sealing layer 22 is preferably provided with processing such as creating a small hole in part of the sealing layer 22. Accordingly, the fuel cell 1 illustrated in FIG. 1 is completed.

In the fuel cell 1, the liquid fuel contained in the fuel tank 11 is pumped by the fuel supply section 12, and reaches the fuel vaporization section 13 through the flow path 12c. In the fuel vaporization section 13, when the liquid fuel is ejected by the nozzle section 14, the ejected liquid fuel is diffused in a wide range by the diffusion section provided on the surface thereof. Thereby, the liquid fuel is naturally vaporized. At this time, the vaporization rate is determined by the surface area of the diffusion section. Thus, the fuel supply amount to the power generation section 10 side is able to be adjusted by setting the surface area of the diffusion section according to the necessary power generation amount. The fuel vaporized as above is ejected from the ejection hole of the nozzle section 14, and thereby the fuel is supplied to the anode electrode 16 of the power generation section 10. Meanwhile, air (oxygen) is supplied to the cathode electrode 18 of the power generation section 10 by natural ventilation or the air supply pump (not illustrated). In result, in the anode electrode 16, the reaction shown in Formula (1) is initiated, and hydrogen ions and electrons are generated. The hydrogen ions reach the cathode electrode 18 through the electrolyte film 17. In the cathode electrode 18, the reaction shown in Formula (2) is initiated, and water and carbon dioxide are generated. Thus, in the whole fuel cell 1, the reaction shown in Formula (3) is initiated and power generation is performed.

$$CH_3OH + H_2O \rightarrow CO_2 + 6H^+ + 6e^- \qquad (1)$$

$$6H^+ + (3/2)O_2 + 6e^- \rightarrow 3H_2O \qquad (2)$$

$$CH_3OH + (3/2)O_2 \rightarrow CO_2 + 2H_2O \qquad (3)$$

At this time, in the fuel supply section 12, the fuel amount to be supplied is able to be adjusted. Thus, differently from the power generation in which natural vaporization and capillary force are used without adjusting the supply amount, for example, the fuel supply amount is able to be changed according to the power generation state and the electric power necessary for the device. In result, startup and stop are enabled at desired time.

In the case where a joint section is provided between the fuel supply section 12 and the fuel vaporization section 13 as in the past, there has been a disadvantage that the whole thickness is increased by the joint section. Meanwhile, in this embodiment, since the fuel supply section 12 and the fuel vaporization section 13 are integrally provided, the existing joint section is not necessitated, and the dead space does not exist. Thus, the whole thickness is able to be decreased. Thus, in this embodiment, while stable electric supply is maintained, a thin fuel cell is able to be realized.

Further, in the existing structure in which the joint section is used, there is a disadvantage that fuel leakage is easily generated from the connection section between the fuel supply section 12 and the fuel vaporization section 13, usage efficiency of the fuel is lowered, and electric power supply becomes unstable. Meanwhile, again, in this embodiment, since the fuel supply section 12 and the fuel vaporization section 13 are integrally provided, the fuel leakage is prevented, resulting in advantage to stabilizing the output.

Figure 3:
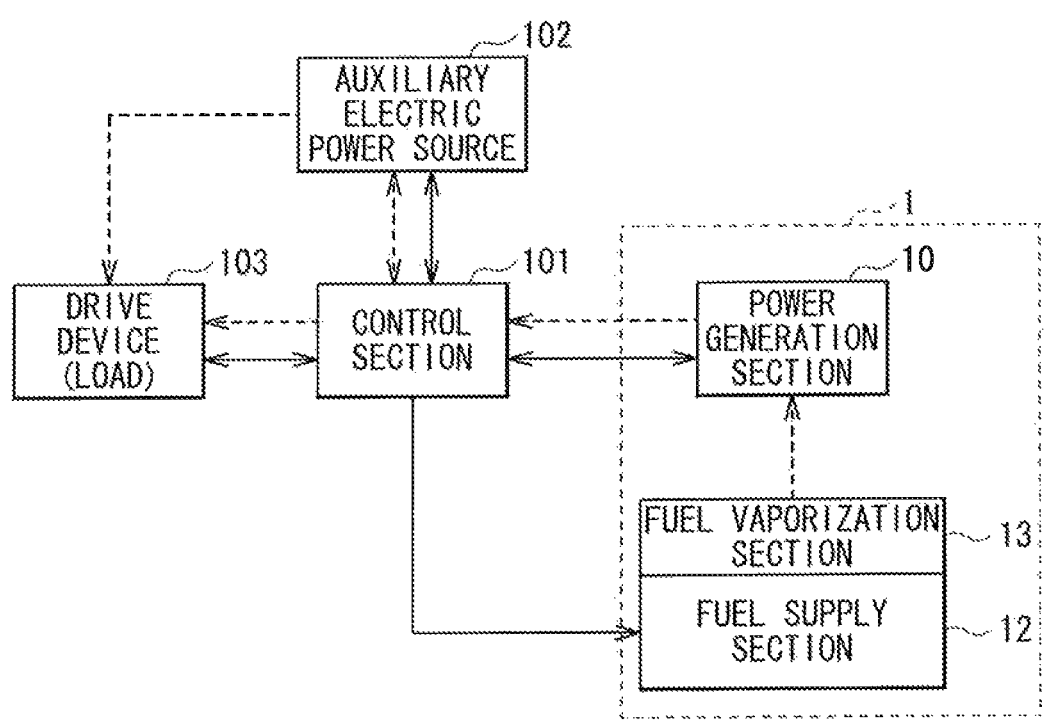
FIG. 3 is a diagram illustrating a whole structure of an example of a system to which the fuel cell illustrated in FIG. 1 is applied.

Further, FIG. 3 illustrates an example of a system to which the fuel cell 1 is applied. In the system, according to the state of the power generation section 10 of the fuel cell 1 or an electric power necessary for a drive device 103, the fuel supply section 12 is controlled by the control section 101, and thereby a fuel is supplied. After the supplied fuel is vaporized by the fuel vaporization section 13, the fuel is transported to the power generation section 10 side, and power generation is made in the power generation section 10. The electric power generated in the power generation section 10 as described above is controlled by the control section 101, and thereby the electric power is retained in an auxiliary electric power source 102, or is outputted to the drive device 103 side. By such a system, an optimal fuel amount is able to be fed back, and thus stability of electric power supply and usage efficiency of the fuel are able to be improved.

Next, a description will be given of a modified example of the present invention.

(First Modified Example)

Figure 4:
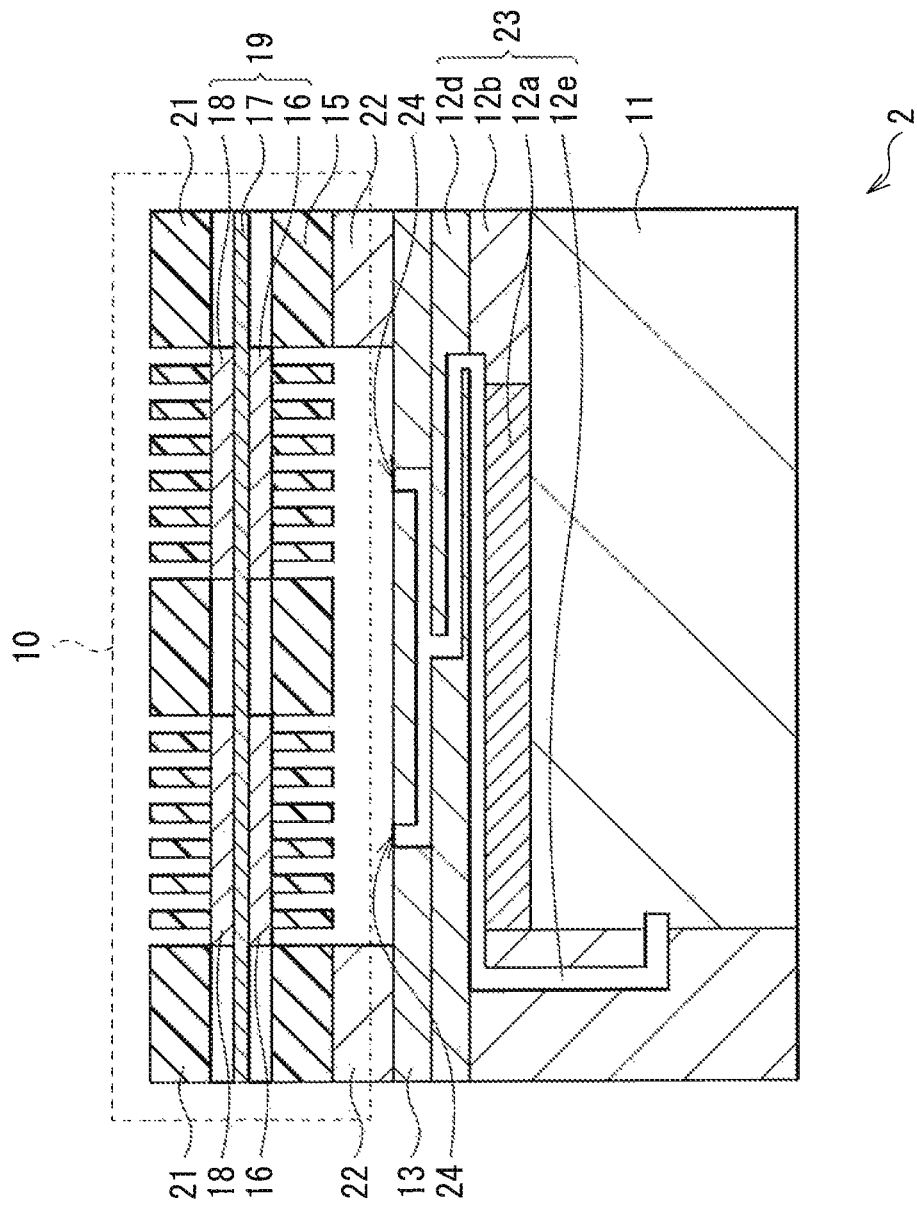
FIG. 4 is a cross sectional view illustrating a fuel cell according to a first modified example of the present invention.

FIG. 4 illustrates a schematic structure of a fuel cell 2 according to a first modified example of the present invention. The fuel cell 2 has the same structure as that of the fuel cell 1 described in the foregoing embodiment, except for structures of a fuel supply section 23 and a nozzle section 24 buried in the fuel vaporization section 13. Thus, the corresponding elements are affixed with the same reference symbols, and descriptions thereof will be omitted as appropriate.

The fuel supply section 23 functions as a pump to pump a liquid fuel contained in the fuel tank 11 and supply (transport) the liquid fuel to the power generation section 10 side, and is able to adjust the supply amount of the fuel. The fuel supply section 23 has, for example, the piezoelectric body 12a, the piezoelectric body support resin section 12b, a piezoelectric body support plate 12d, and a flow path 12e. The piezoelectric body support plate 12d is a plate provided to support the piezoelectric body 12a, and is made of a material similar to that of the plate structuring the foregoing fuel vaporization section 13. The flow path 12e extends from the fuel tank 11, passes along the piezoelectric body 12a and the piezoelectric body support plate 12d, is branched for every region corresponding to the combined body 19, and is connected to the nozzle section 24 described later.

The nozzle section 24 is an ejection hole of the fuel transported by the flow path 12e of the fuel supply section 23, and ejects the fuel toward the diffusion section provided on the surface of the fuel vaporization section 13. Thereby, the fuel pumped by the fuel supply section 23 is transported to the fuel vaporization section 13, and the fuel vaporized by the fuel vaporization section 13 is ejected toward the power generation section 10. The plurality of the nozzle sections 24 are provided correspondingly to the flow path 12e branched for every region corresponding to the combined body 19.

Further, the fuel supply section 23 and the fuel vaporization section 13 having the foregoing structure are integrally formed as follows. First, in a plate as the fuel supply section 23, the flow path pattern (nozzle section 24) branched for every combined body 19 is formed by etching or the like. Next, the piezoelectric body support plate 12d in which the flow path 12e is formed is adhered to the rear face side of the plate by an adhesion sheet or the like. The piezoelectric body 12a is fixed to the piezoelectric body support plate 12d with the piezoelectric body support resin section 12b in between. Meanwhile, the diffusion section is provided on the front face side of the plate of the fuel vaporization section 13. Thereby, the fuel supply section 23 and the fuel vaporization section 13 are integrally formed. Otherwise, the fuel vaporization section 13, the nozzle section 24, the piezoelectric body support plate 12d, and the flow path 12e may be formed as an integral part by using etching and diffusion junction technology or the like.

As described above, in this modified example, since the flow path 12e is branched for every region corresponding to the combined body 19, the fuel vaporized by the fuel vaporization section 13 passes through the branched flow path 12e, and is ejected while being diffused for every combined body 19 by the nozzle section 24. Thus, since the fuel is able to be more uniformly supplied to the respective combined bodies 19, more stable power generation is enabled.

(Second Modified Example)

Figure 5:
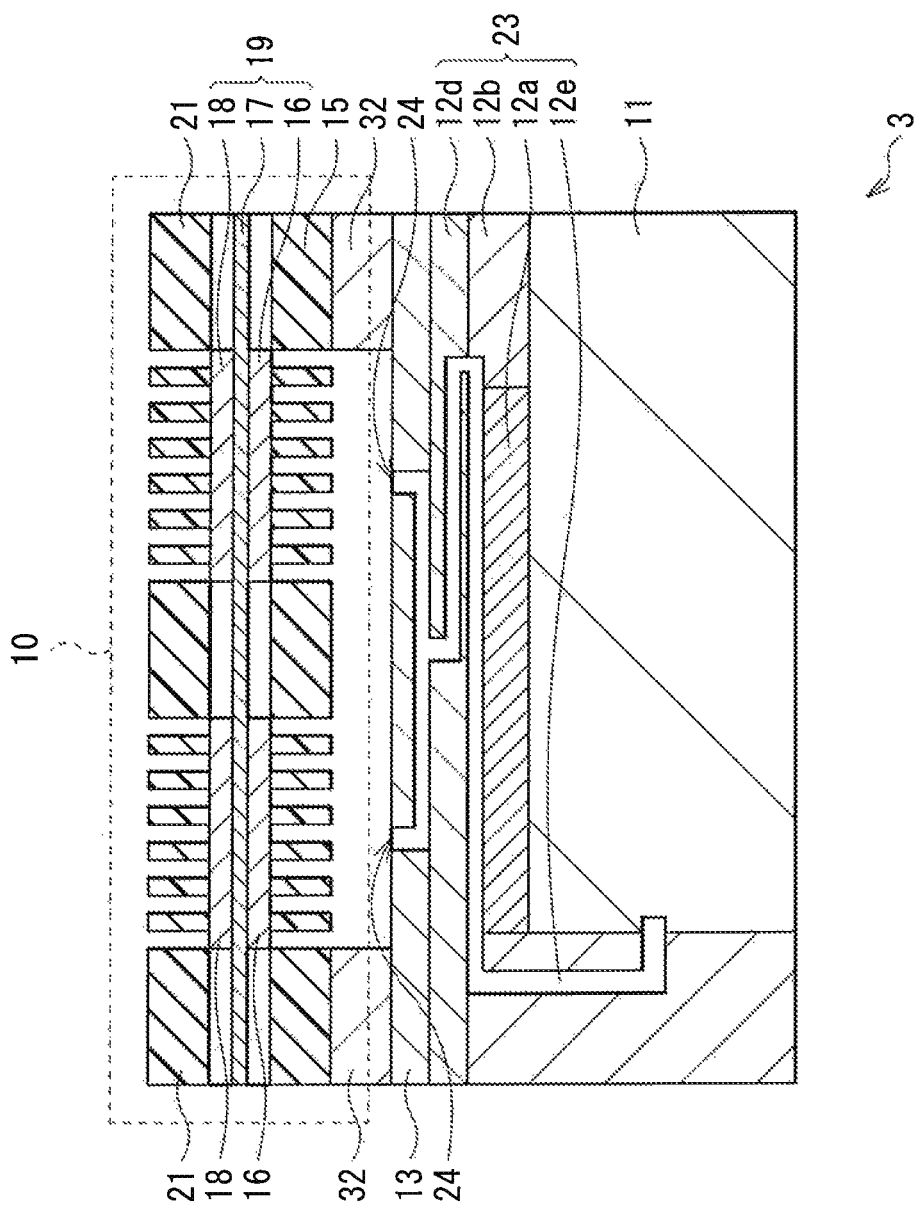
FIG. 5 is a cross sectional view illustrating a fuel cell according to a second modified example of the present invention.

FIG. 5 illustrates a schematic structure of a fuel cell 3 according to a second modified example of the invention. The fuel cell 3 has the same structure as that of the fuel cell 1 described in the foregoing embodiment, except for the structures of the fuel supply section 23 and the nozzle section 24, and except that a heat conduction section 32 is provided instead of the sealing layer 22. The structures of the fuel supply section 23 and the nozzle section 24 are similar to those of the fuel cell 2 described in the foregoing first modified example. Thus, the same elements as those of the fuel cell 1 and the fuel cell 2 are affixed with the same reference symbols, and descriptions thereof will be omitted as appropriate.

The heat conduction section 32 has a structure similar to that of the sealing layer 22 described in the fuel cell 1 of FIG. 1, and is made of a material having high heat conductivity. Examples of materials thereof include a metal material such as copper (Co) and aluminum (Al), a heat conductive sheet, and a heat conductive grease.

In general, while power generation results in moist environment and increased temperature in the power generation section 10, vaporization of the liquid fuel results in heat removal and dropped temperature in the fuel vaporization section 13. Thus, there is a disadvantage as follows. Due to power generation operation for a long time, dew condensation is generated in the fuel vaporization section 13. Being affected thereby, sufficient methanol is not supplied to the power generation section 10, and water spills out of the system. Thus, to prevent the foregoing disadvantage, temperature is controlled by mounting a heater or the like. However, in such a structure, electric power is consumed. In addition, such a structure is not advantageous to realizing a thin and small fuel cell.

Meanwhile, in this modified example, the power generation section 10 and the fuel vaporizing section 13 are connected by the heat conduction section 32 having heat conductivity. Thus, heat generated in the power generation section 10 is easily transferred to the fuel vaporizing section 13. Thereby, heat release of the power generation section 10 is enabled, and heat energy necessary for vaporizing the fuel is able to be supplied to the fuel vaporizing section 13. Thus, temperature difference is hardly generated between the power generation section 10 and the fuel vaporization section 13, and dew condensation in the fuel vaporizing section 13 is able to be effectively inhibited from being generated.

In this modified example, the description has been given of, as an example, the case that the heat conduction section 32 is further provided in addition to the structure of the fuel cell 2 in which the nozzle section 24 with the flow path branched for every combined body 19 as described in the foregoing first modified example is used. However, it is needless to say that the technology of this modified example is able to be applied to the structure of the fuel cell 1 in which the nozzle section 14 with the flow path not branched as illustrated in FIG. 1 is used.

EXAMPLES

Next, a description will be given of examples of the present invention.

Example 1

As Example 1, the fuel cell 1 illustrated in FIG. 1 and FIG. 2 was fabricated. However, as the anode electrode 16 and the cathode electrode 18, an anode electrode and a cathode electrode having dimensions of 15 mm*15 mm were used. Further, as the fuel supply section 12, the SUS piezoelectric body support resin section 12b having a thickness of 0.7 mm (including the piezoelectric body 12a) was used. As the fuel vaporization section 13, an SUS plate having a thickness of 0.3 mm was used. As the nozzle section 14, a nozzle having an ejection hole with a bore diameter of 0.3 mm was used. Further, as a liquid fuel, a reagent highest quality methanol (Wako Pure Chemical Industries, Ltd. make) was used. On the fuel vaporization section 13, a porous PP sheet 20 μm was formed. In addition, as the power generation section 10, as illustrated in FIG. 2, a structure in which six combined bodies 19 were arranged in a matrix of two by three vertically and horizontally in a plane and the combined bodies 19 were electrically connected in series (connected in the inverted C shape) was used.

Figure 8:
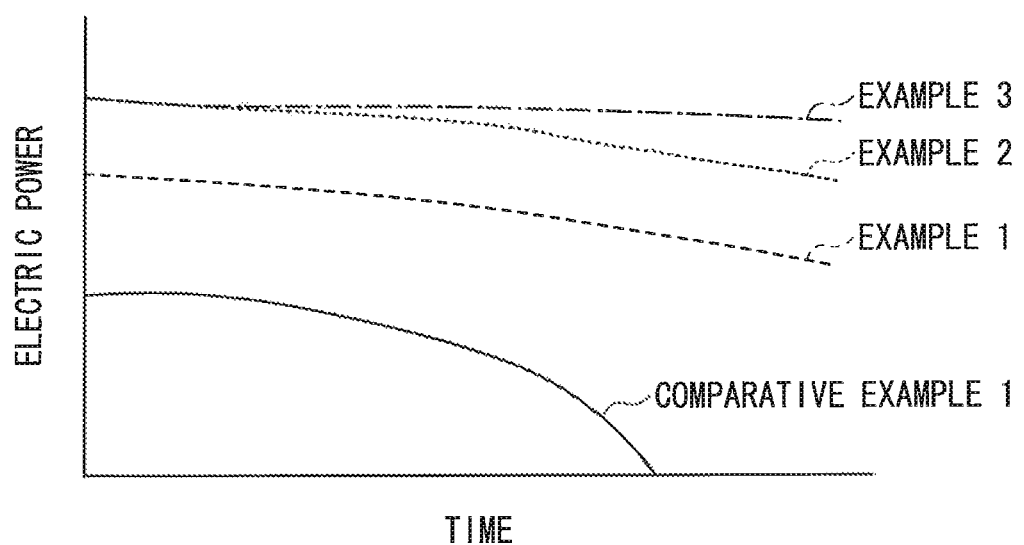
FIG. 8 is characteristic diagram illustrating an output (electric power) with respect to elapsed time for examples and a comparative example.

The thickness (mm) of the whole fuel cell 1 of Example 1 fabricated as above was measured. Further, power generation test was performed under the conditions that the fuel supply rate of the fuel supply section 12 was about 15 μ/min, and the drive voltage was constant voltage of 1.8 V. FIG. 8 illustrates a relation of a generated electric power with regard to lapsed time. Table 1 illustrates the whole thickness (mm), the output after 1 hour (mW), the output after 30 hours (mW), and the output retention ratio after 30 hours (%).

TABLE 1

| | Whole thickness (mm) | Output after 1 hour (mW) | Output after 30 hours (mW) | Output retention ratio (%) |
|---|---|---|---|---|
| Example 1 | 15 | 784 | 710 | 91 |
| Example 2 | 15 | 841 | 760 | 90 |
| Example 3 | 14 | 835 | 829 | 99 |
| Comparative example 1 | 15 | 633 | 498 | 79 |
| Comparative example 2 | 17 | 773 | 695 | 90 |

Example 2

As Example 2, the fuel cell 2 illustrated in FIG. 4 was fabricated. However, in Example 2, structure conditions were similar to those of the foregoing Example 1, except that the bore diameter of the ejection hole of the nozzle section 24 provided for every combined body 19 was 0.3 mm, and an SUS plate having a thickness of 0.5 mm obtained by integrating the fuel vaporization section 13 and the piezoelectric body support resin section 12b with the use of a combination of etching and diffusion junction technology.

Example 3

As Example 3, the fuel cell 3 illustrated in FIG. 5 was fabricated. However, in Example 3, structure conditions were similar to those of the foregoing Example 1, except that the power generation section 10 and the fuel vaporization section 13 were jointed by the heat conduction section 32 made of aluminum having a thickness of 0.2 mm. For the fuel cell 2 of Example 2 and the fuel cell 3 of Example 3 fabricated as above, the thickness was measured and power generation test was performed under conditions similar to those of the foregoing Example 1. The results of Example 2 and Example 3 are illustrated in FIG. 8 and Table 1 together with the results of Example 1.

Comparative Example 1

Figure 6:
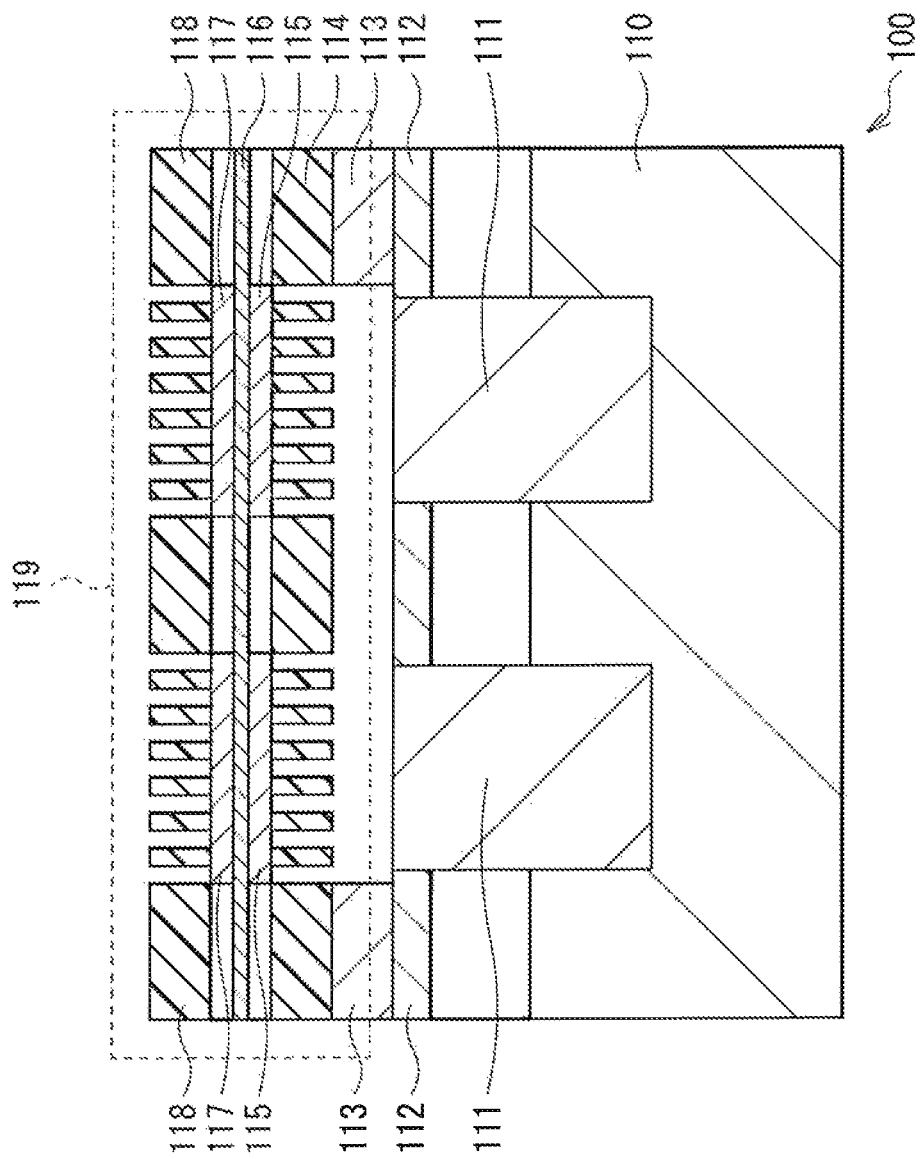
FIG. 6 is a cross sectional view illustrating a schematic structure of a fuel cell according to Comparative example 1.

As Comparative example 1 of Examples 1 to 3, a fuel cell 100 illustrated in FIG. 6 was fabricated. The fuel cell 100 includes a fuel tank 110, a porous body 111, a fuel vaporization section 112, a sealing section 113, and a power generation section 119. The power generation section 119 includes a gasket 114, an anode electrode 115, an electrolyte film 116, a cathode electrode 117, and a cell plate 118. In the fuel cell 100, a liquid fuel contained in the fuel tank 110 is pumped by capillary force of the porous body 111, is vaporized by the fuel vaporization section 112, and then is supplied to the power generation section 119. However, the structure thereof (material and thickness) was similar to that of the foregoing Example 1, except that the porous body 111 made of a core material composed of a bundle of polyester fiber was used instead of the fuel supply section 12.

For the fuel cell 100 of Comparative example 1 fabricated as above, the whole thickness was measured and power generation test was performed. The results thereof are illustrated in FIG. 8 and Table 1 together with the results of Examples 1 to 3. However, power generation test was performed under conditions similar to those of the foregoing Example 1, except that the fuel supply rate was not adjusted (was not able to be adjusted).

Comparative Example 2

Figure 7:
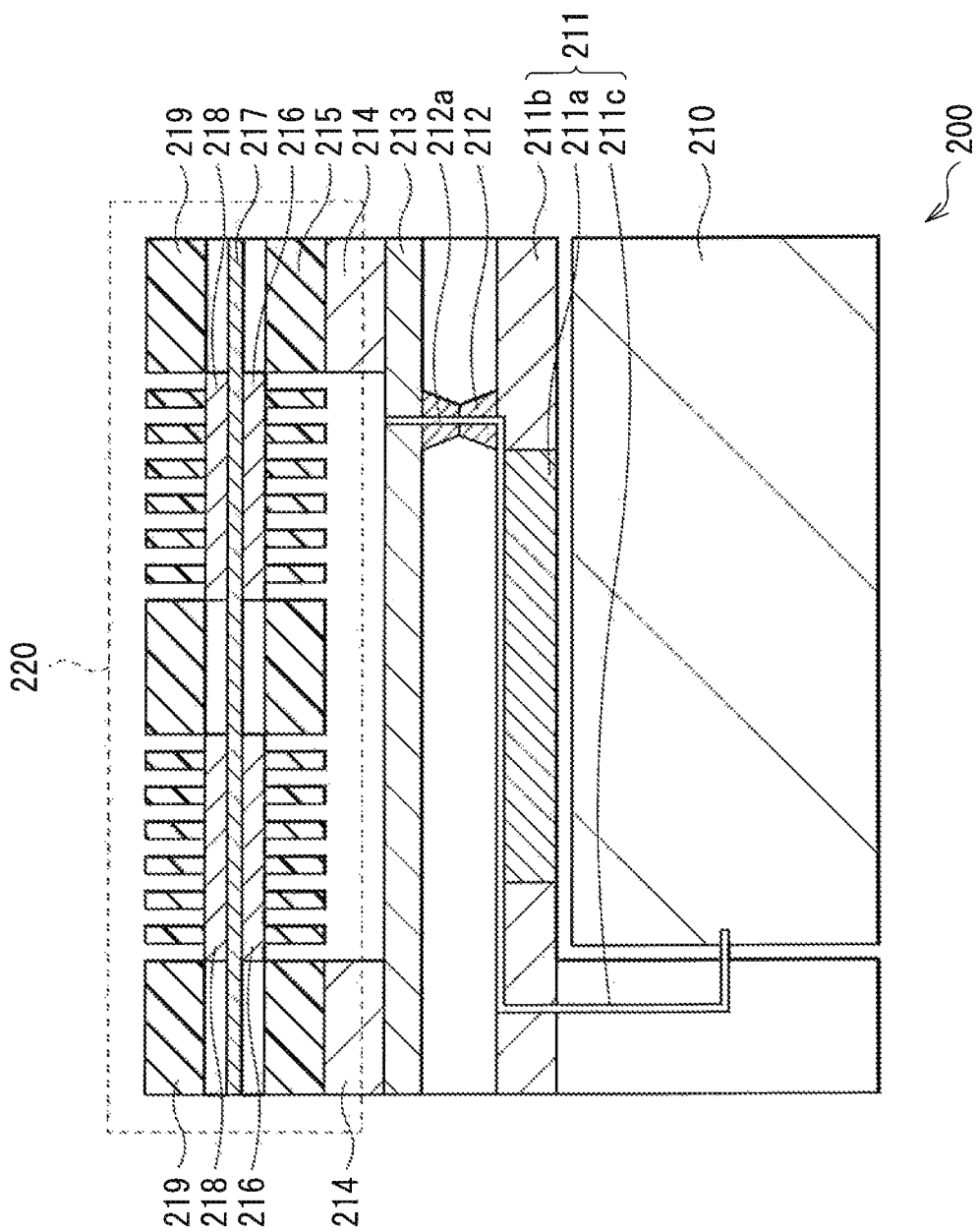
FIG. 7 is a cross sectional view illustrating a schematic structure of a fuel cell according to Comparative example 2.

As Comparative example 2, a fuel cell 200 illustrated in FIG. 7 was fabricated. The fuel cell 200 includes a fuel tank 210, a fuel supply section 211, a joint section 212, a fuel vaporization section 213, a sealing section 214, and a power generation section 220. The power generation section 220 includes a gasket 215, an anode electrode 216, an electrolyte film 217, a cathode electrode 218, and a cell plate 219. Further, the fuel supply section 211 and the fuel vaporization section 213 are connected with the joint section 212 in between. That is, the fuel supply section 211 and the fuel vaporization section 213 are not integrated, and a fuel is transported by a nozzle section 212a provided inside the joint section 212. In the fuel cell 200, a liquid fuel contained in the fuel tank 210 is pumped by the fuel supply section 211, is vaporized by the fuel vaporization section 213, and then is supplied to the power generation section 220. However, the structure thereof (material and thickness) was similar to that of the foregoing Example 1, except that the fuel supply section 211 and the fuel vaporization section 213 were connected with the joint section 212 having a thickness of 2 mm in between.

For the fuel cell 200 of Comparative example 2 fabricated as above, the whole thickness was measured and power generation test was performed under conditions similar to those of the foregoing Example 1. The results thereof are illustrated in FIG. 8 and Table 1 together with the results of Examples 1 to 3.

As illustrated in Table 1 and FIG. 8, it was found that in Example 1 including the fuel supply section with which the supply amount of the fuel was adjustable, the output electric power was higher than that of Comparative example 1 using capillary force such as the porous body. Further, as time went by, while the output was lowered and the retention ratio was decreased down to 79% in Comparative example 1, a stable electric power supply was realized and the retention ratio was high, 91% in Example 1.

Further, it was found that in Example 2 in which the flow path of the fuel was branched for every combined body or, in Example 3 in which the heat conduction section was provided between the power generation section and the fuel vaporization section, a higher and more stable output was able to be obtained. In particular, the output retention ratio was significantly high, 99% in Example 3. It results from the following reason. In general, after a long time power generation operation, temperature in the power generation section is increased and dew condensation is easily generated. However, in Example 3, temperature difference was hardly generated between the power generation section and the fuel vaporization section connected by the heat conduction section, and thereby dew condensation was possibly inhibited from being generated.

Meanwhile, as illustrated in Table 1, with regard to the whole thickness, in Examples 1 to 3 in which the fuel supply section and the fuel evaporation section were integrally provided, the thickness was thinner by about 2 mm compared to that of the fuel cell 200 of Comparative example 2 having the joint section between the fuel supply section and the fuel vaporization section. Accordingly, it was found that by integrally providing the fuel supply section and the fuel evaporation section, a fuel cell that was thin and was able to provide stable electric power supply was realized.

The present invention has been described with reference to the embodiment and the examples. However, the present invention is not limited to the foregoing embodiment and the like, and various modifications may be made. For example, in the foregoing embodiment, the description has been specifically given of the structures of the electrolyte film 17, the anode electrode 16, and the cathode electrode 18. However, other structure or other material of the electrolyte film 17, the anode electrode 16, and the cathode electrode 18 may be adopted.

Further, in the foregoing embodiment and the like, the description has been given of the case that six combined bodies 19 are provided in a matrix of three by two in a plane. However, the number and the arrangement of the combined body 19 are not limited thereto. Moreover, the description has been given of the case that the six combined bodies 19 are electrically connected in series (connected in the inverted C shape). However, the connection method is not limited thereto, and effects of the present invention are attained with the use of other connection method.

Further, in the foregoing embodiment and the like, the description has been given by taking an example of the structure in which the piezoelectric body is provided on the plate as the fuel supply section 12. However, the structure is not limited thereto, and effects of the present invention are attained as long as it works as a pump capable of adjusting the supply amount of the fuel according to the state of the power generation section 10.

In addition, in the foregoing embodiment and the like, the sealing layer 22 or the heat conduction section 32 is provided between the power generation section 10 and the fuel vaporization section 13. However, the sealing layer 22 and the heat conduction section 32 are not necessarily provided. That is, effects of the present invention are attained with the use of a structure in which the fuel vaporization section 13 and the fuel supply section 12 are integrally provided for the power generation section 10.

Further, in the foregoing embodiment and the like, the description has been given by taking the DMFC as an example. However, the applicable fuel cell is not limited thereto, but the present invention is able to be applied to other type of fuel cell such as a polymer electrolyte fuel cell with the use of hydrogen as a fuel, a direct ethanol fuel cell, and a dimethyl ether fuel cell.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A fuel cell comprising:
a power generation section in which a pair of electrodes are oppositely arranged with an electrolyte film in between;
a fuel tank containing a liquid fuel;
a fuel supply section supplying the liquid fuel from the fuel tank to the power generation section side, and being able to adjust a supply amount thereof; and
a fuel vaporization section vaporizing the liquid fuel supplied by the fuel supply section, wherein the fuel supply section and the fuel vaporization section are integrally provided by a first side of the fuel vaporization section being configured to vaporize the fuel and a second side of the fuel vaporization section, opposite the first side, defining a portion of a flow path in which the fuel supply section is disposed.

2. The fuel cell according to claim 1, wherein the fuel supply section includes a piezoelectric body.

3. The fuel cell according to claim 1, wherein a plurality of the power generation sections are arranged, and the power generation sections are electrically connected in series.

4. The fuel cell according to claim 3 wherein the flow path is configured to transport a fuel from the fuel supply section and the fuel vaporization section to the power generation section side, wherein the flow path is provided for each of the plurality of power generation sections.

5. The fuel cell according to claim 1 comprising:
a heat conductive member for connecting the fuel vaporization section and the power generation section side.

6. The fuel cell according to claim 1, wherein a total of a thickness of the fuel supply section and a thickness of the fuel vaporization section is within 2 mm.

7. An electronic device including a fuel cell, wherein the fuel cell comprises:
a power generation section in which a pair of electrodes are oppositely arranged with an electrolyte film in between;
a fuel tank containing a liquid fuel;
a fuel supply section supplying the liquid fuel from the fuel tank to the power generation section side, and being able to adjust a supply amount thereof; and
a fuel vaporization section vaporizing the liquid fuel supplied by the fuel supply section, wherein the fuel supply section and the fuel vaporization section are integrally provided such that a side of the fuel vaporization section defines a portion of a flow path in which the fuel supply section is disposed.

8. The fuel cell according to claim 1, further comprising a nozzle section integrally formed with the fuel vaporization section, the nozzle section being configured to eject fuel from the fuel supply section to the first side of the fuel vaporization section.

9. The fuel cell according to claim 1, wherein the fuel vaporization section includes a plate that forms a side of the fuel flow path of the fuel supply section.

10. The fuel cell according to claim 1, wherein a section of the flow path includes a first side that is defined by the second side of the fuel vaporization section and a second side that is defined by a membrane pump.

* * * * *